United States Patent [19]

Schneider

[11] 4,286,679
[45] Sep. 1, 1981

[54] ANIMAL SCALE

[75] Inventor: H. Allen Schneider, Mead, Wash.

[73] Assignee: Weigh Right Electronic Systems, Inc., Spokane, Wash.

[21] Appl. No.: 74,977

[22] Filed: Sep. 13, 1979

[51] Int. Cl.³ .................... G01G 19/52; G01G 23/02; G01G 21/24

[52] U.S. Cl. .................................. 177/132; 177/155; 177/255

[58] Field of Search ............... 177/132, 155, 156, 159, 177/154, 147, 255

[56] References Cited

U.S. PATENT DOCUMENTS

| | | | |
|---|---|---|---|
| 2,035,982 | 3/1936 | Robinson et al. | 177/255 |
| 2,873,106 | 2/1959 | Fassbinder | 177/255 |
| 2,902,272 | 9/1959 | Meier | 177/154 X |
| 3,472,329 | 10/1969 | Smith | 177/132 X |
| 3,517,762 | 6/1970 | Hedger | 177/147 X |

Primary Examiner—George H. Miller, Jr.
Attorney, Agent, or Firm—Wells, St. John & Roberts

[57] ABSTRACT

A scale for weighing an animal as it moves along a weighing platform. The platform is suspended at four corners with tensile load cells mounted to mechanisms suspending the platform at the corners. Weight applied to the platform will produce tensile stress in the load cells. The cells produce analogue signals that are proportional to the magnitude of the tensile forces. A restraining device allows slight vertical platform movement (in response to applied load) while restraining longitudinal and transverse platform movement. The suspension means and restraining means operate to allow transfer of vertical stress on the load cells with horizontal restraints being eliminated through the suspension and restraining means.

6 Claims, 6 Drawing Figures

ANIMAL SCALE

BACKGROUND OF THE INVENTION

The present invention is related to scales used for weighing animals such as cattle as they move along a chute.

It is very helpful for a rancher to control feeding by maintaining proper growth rate charts on his animals. It is also beneficial to keep a chart on each animal as means for keeping track of health conditions and maturity. Consequently it is necessary to periodically weigh the animals.

The typical livestock scale includes a weight "beam" supporting a floating deck. The animals are directed onto the deck which will move both vertically and horizontally under the weight of the animal. Cattle become easily frightened when they are unsure of their footing and movement of the platform generally upsets the animal. Therefore, time must be spent in calming the animal before an accurate weight measurement can be recorded. One of the difficulties, then, is the inability for conventional forms of animal scales to quickly weight moving animals.

The prior forms of animal scales include the weight sensing mechanisms directly below the weighing platform. The usually sensitive mechanism is therefore exposed to extremely adverse environmental conditions and must be continuously and carefully cleaned. Furthermore, the sensitivity of the scales varies with the ground terrain upon which the scales rest. Uneven terrain will result in inaccurate weight recordings. It is always preferable to have these scales on a perfectly flat, horizontal surface. Otherwise, the weighing platform of the scale will meet resistance in downward movement and inaccurately display animal weight.

It becomes desirable, from the above situations, to obtain some form of animal weighing scale that will accurately and relatively instantaneously weigh a moving animal. This becomes a particularly desirable feature when many animals are to be weighed in a short period of time.

It is also desirable to obtain some form of scale that will weigh animals over a wide weight range to enable weighing of both young and mature animals.

It is also desirable to obtain some form of animal scale that is totally portable and that may be set up on relatively uneven terrain.

It is also desirable to obtain such a scale that includes its weight sensing mechanism above the animal receiving platform and therefore avoid the adverse environment beneath the platform.

BRIEF DESCRIPTION OF THE DRAWINGS

A preferred embodiment of the present invention is illustrated in the accompanying drawings in which.

DETAILED DESCRIPTION OF A PREFERRED EMBODIMENT

The present animal scale 10 as shown in the accompanying drawings is of the type used preferably for heavier animals such as cattle. It is envisioned, however, that the scale may be used for other domestic animals, larger or smaller than cattle.

Figure 1:
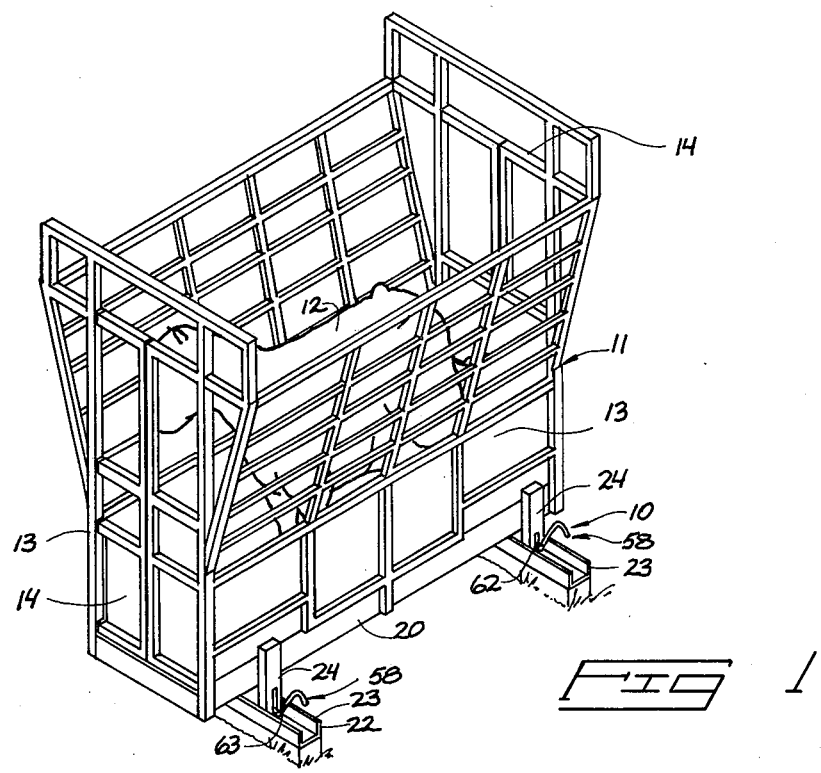
FIG. 1 is an isometric view of a cattle chute and a calf resting on the present scale.
Figure 2:
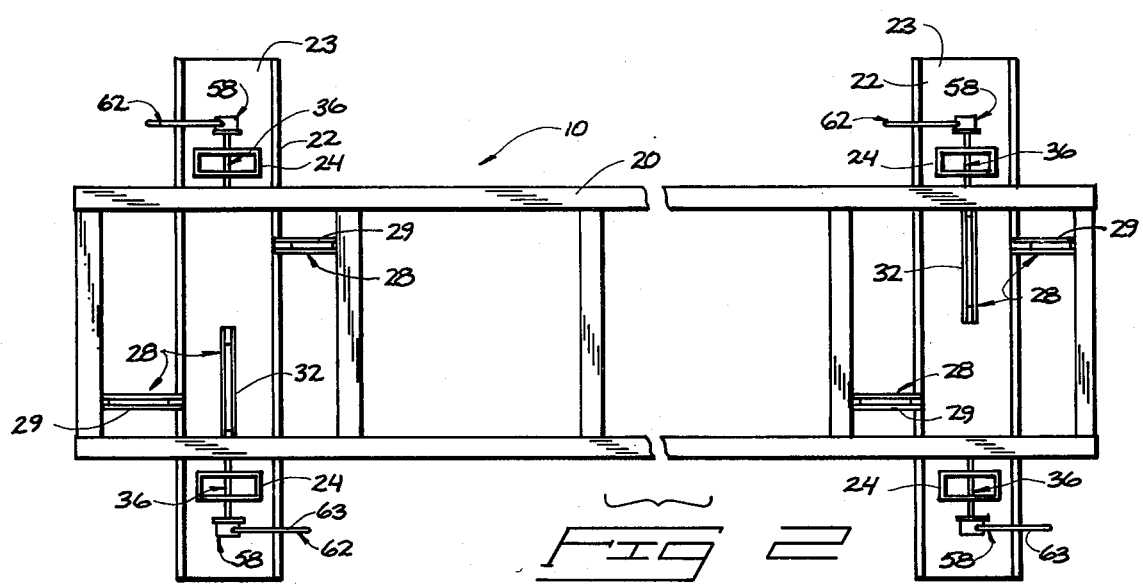
FIG. 2 is a partially fragmented view of a frame and platform of the present scale.

FIG. 1 shows the present invention being used in conjunction with a cattle chute 11. A calf 12 is shown confined within the chute 11. The animal 12 is situated between chute sides 13 and is prevented from exiting by opposed gates 14. It is understood that the form of chute 11 may vary with the intended use for the present scale 10 and various other forms of chutes or confining or guiding arrangements may be used as well.

The present invention is embodied primarily within the lower portions of the chute 11 adjacent a supportive platform 20. The platform 20 is designed to receive and support the weight of successive animals moving along the chute. The platform 20 provides a flat, planar surface 21 that is rectangular and elongated in the path of the chute 11.

The platform 20 is mounted to a support frame 22. The frame 22 may simply be comprised of a pair of parallel horizontal channels 23 that extend transverse to the length of the platform 20. The channels 23 are located directly below the platform 20 but include ends that extend laterally outward from the platform sides. Upright housings or "towers" 24 are situated at the ends of the channels 23 on opposite sides of the platform. One such tower 24 is situated near each corner of the platform.

The platform 20 and support frame 22 are interconnected by a restraining means generally shown at 28. The restraining means functions to restrain longitudinal or transverse movement of the platform on the frame. Vertical movement, however, is allowed to a limited extent due to the geometry of the restraining means 28.

Figure 3:
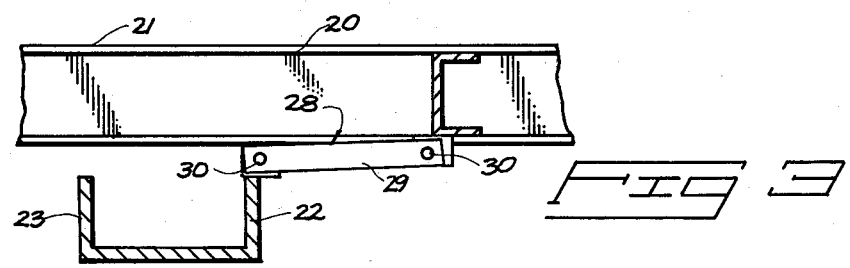
FIG. 3 is a fragmentary detailed view of a restraint for limiting motion of the platform.

Restraining means 28 includes longitudinal tie bars 29 (interconnecting members) that are arranged in pairs at opposite ends of the platform, interconnecting the platform and frame. Pivot pins 30 (FIG. 3) mounted at opposite ends of the tie bars 29 pivotably mount the platform to the frame. Axes for the pins 30 are transverse to the length of the platform.

The restraining means 28 also includes transverse tie bars 32 (interconnecting members). The transverse tie bars 32 are provided in pairs at opposite ends of the platform. The tie bars 32 are also connected pivotably between the platform and frame. Pins 33 mount the tie bars to the platform and frame about pivot axes that run parallel to the planar surface of the platform and to the direction of elongation thereof.

The tie bars 29 and 32 will substantially prevent horizontal motion of the platform on the frame. The tie bars 29 and 32 will, however, allow a limited amount of vertical motion due to the nearly horizontal relationship of the tie bars. Vertical movement of approximately three-eighths inches is sufficient to enable accurate weighing without being detected by the animal.

Figure 4:
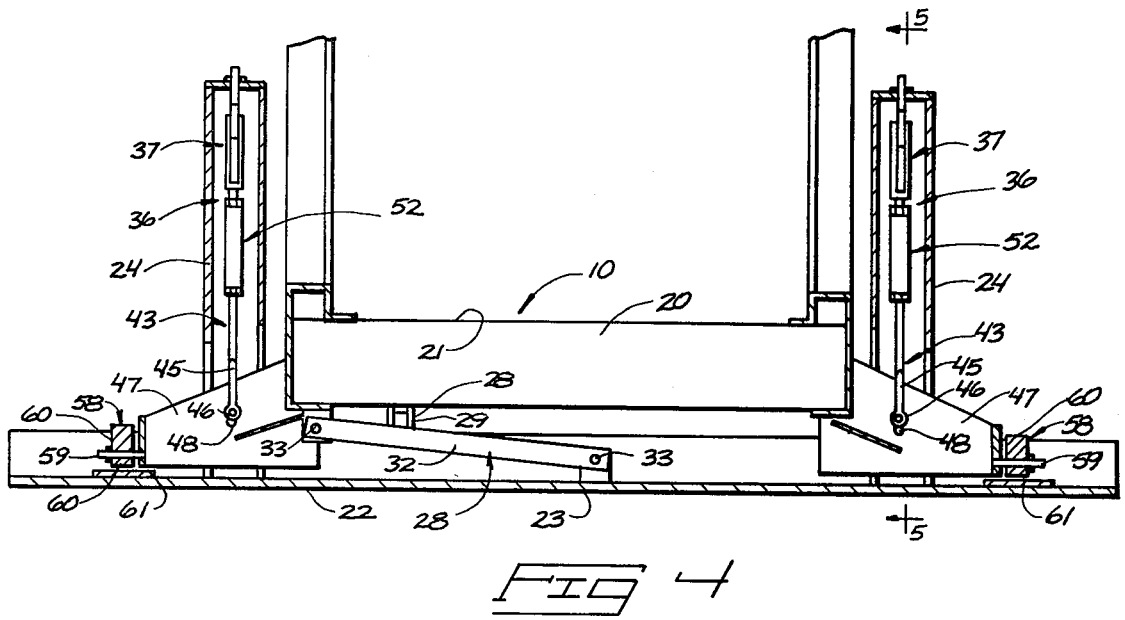
FIG. 4 is an enlarged sectional view taken transversely through the frame and platform.

Lateral or horizontal forces on the weight platform will be transmitted to the frame while vertical forces are applied to a platform suspension means generally shown at 36. The suspension means 36 is shown in substantial detail by FIGS. 4 and 5 for suspending the platform from the frame.

The platform suspension means 36 is situated within the upright towers 24 at each of the four platform corners. The contents of each tower 24 is identical, and description of one will serve for all.

The suspension means 36 in each tower 24 includes a top clevis assembly 37 suspended from the tower by an adjusting nut 38 and shank 39. A plate 40 is situated at the lower end of shank 39 to which a clevis 41 is pivotably mounted. A pin 42 extends through the clevis and plate 40 on an axis transverse to the length of platform 20.

A bottom clevis assembly 43 is also illustrated, operatively connected to the top clevis assembly 37. The bottom clevis assembly 43 includes a shank 44 leading to a clevis 45 that is mounted by a pin 46 to an outwardly projecting arm 47 of the platform. The arm 47 is provided with an upright slot 48 for receiving the pin 46.

The top and bottom clevis assemblies serve to "gimbol" the platform from the frame, at least to the extent allowable through the restraint means. The clevis assemblies, with their several free pivot axes, will not bend along their upright lengths but will merely pivot slightly about their several pins and remain under pure tension, aligned with the vertical load between the frame and platform.

A tensile load cell means 52 (FIG. 5) is situated between each of the pairs of clevis assemblies 37 and 43. The tensile load cells include strain sensing bodies 53 that are situated elevationally above the platform surface 21 and outwardly adjacent to the longitudinal sides thereof. The particular load cell shown is commercially available from Interface, Inc., 7401 E. Butherus Dr., Scottsdale, Ariz. 85260.

The tensile load cell bodies 53 are attached by threaded connectors 54 to the clevis assembly 37 and 41. The clevis assemblies can therefore transmit tension directly through the bodies 53 at the four positions about the platform 20.

Figure 5:
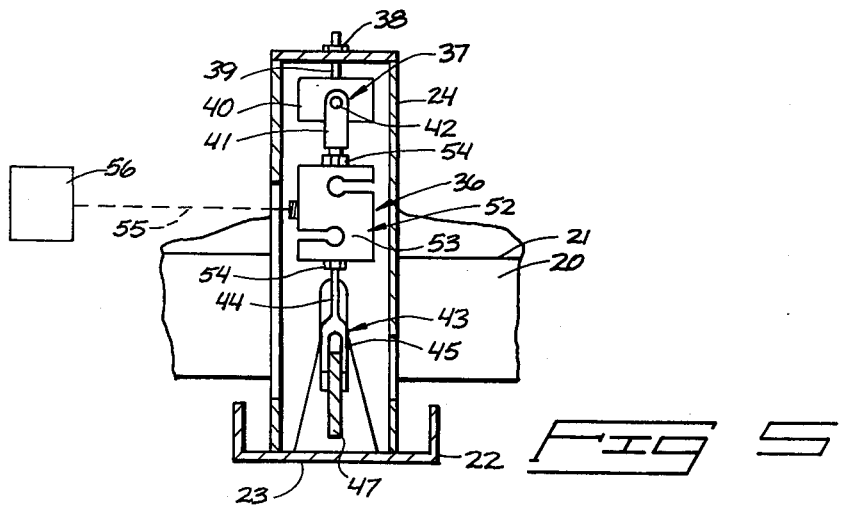
FIG. 5 is a fragmentary sectioned view taken along line 5—5 in FIG. 4.

The tensile load cells 52 each sense a portion of the weight applied on the platform. Each cell produces an analogue signal proportional to the amount of weight sensed and sends the signal through electrical leads 55 to an appropriate form of signal conversion device and display 56 as shown in FIG. 5. The read-out device will convert the signals produced through the cells 52 to a display (not shown).

Figure 6:
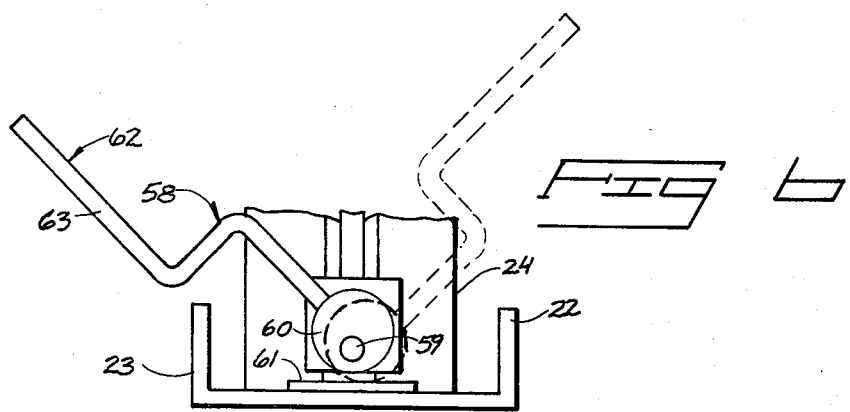
FIG. 6 is an enlarged detailed view of an isolator mechanism.

An isolator means 58 (FIG. 6) is provided, interconnecting the platform and frame for selectively supporting the platform on the frame, bypassing the platform suspension means 36. The isolator means 58 can be moved from inoperative positions wherein the platform is suspended by the suspension means 36 to operative positions directly supporting the platform on the frame.

The isolator means 58 includes pins 59 (FIGS. 4 and 6) projecting outwardly from the arms 47. The pins 59 mount eccentric cams 60. The cams 60 are substantially cylindrical with their axes offset from the pin axes. Means is provided at 62 for selectively pivoting the cams 60 about the pin axes. Means 62 is preferably comprised of a handle 63 for each of the cams 60. The handles 63 are attached directly to the cams 60 and are manually operable between the operative position (solid lines FIG. 6) and inoperative positions (dashed lines FIG. 6). As the handles 63 are pivoted from the inoperative to the operative positions, the cams 60 will move into engagement with pads 61 on the frame 22. Continued movement of the handles toward the operative positions causes the cam surfaces to act against the pads and lift the adjacent platform upwardly. This removes all tension on the adjacent set of clevis assemblies and load cells. The pins 45 will merely slide within the upright slots 48 as the platform is lifted, to avoid placing the cells under compressive forces.

From the above description operation of the present invention may now be understood.

The present animal scale can be placed along a ground or support surface at nearly any desired location. Preferably, however, the scale is positioned in alignment with a chute or other arrangement whereby several animals may be directed along a path in single file. Actually, the present scale may make up an integral portion of a chute, having appropriate sides 13 and ends that will fit as an extension of a regular chute. An example of the device in such a form is shown in FIG. 1. However, the scale can be supplied with existing chute mechanisms mounted on the platform surface.

The present scale 10 is positioned on the ground or other support surface with the isolator means 58 placed in the operative positions. The isolator means will thus avoid any possible damage that might be done to the load cell means and suspension means during the placement operation. The ground terrain in which the scale is placed need not be completely level. No extreme care is necessary in placing the device since the platform is self-aligning by the "gimbol" action of the suspension means 36. A slight variation of the horizontal plane can therefore be compensated for.

After the scale has been positioned the cells 52 and display 56 are connected to an appropriate source of power such as standard household current or direct current battery power. The handles 63 of isolator means 58 are then shifted to the inoperative position, allowing the platform to become completely suspended by the several clevis assemblies and tensile load cells 52. The scale is then ready for use.

A succession of animals may be directed over the platform 20 and can be weighed as they move along the platform length. "Flighty" animals such as cattle will not become agitated due to excessive movement of the platform since the horizontal and longitudinal forces imparted to the platform by the moving animal will not impart similar movement to the platform. The restraining means 28 assures this, with the longitudinal tie bars preventing longitudinal platform movement and the transverse tie bars preventing transverse movement.

The longitudinal and transverse bars 29 and 32, however, will allow slight vertical movement of the platform about the pivot axes of the tie bars. The weight of the animal is therefore directly transmitted through vertical forces to the suspension means 36 and tensile load cells 52. The "gimbol" effect produced through the several clevis assemblies assures that pure tension will be applied to the load cells 52.

The load cells will produce analog signals corresponding to the weight received through the adjacent clevis assemblies and transmit the resulting signal to the display 56. The display will transform the analog signals into a readable output corresponding directly and accurately to the weight of the animal.

Recycling time for the load cells and other mechanisms to return to a normal, unloaded condition, has been found to be approximately two seconds. Therefore, the animals can be effectively and accurately weighed while moving over the length of the platform.

A continuous progression of animals across the scale greatly reduces the time required to weigh and record weights of a relatively large herd. For example, 1100 calves have been weighed within an eight hour period. Weighing of the same number of calves with conventional scales would take approximately three working days. Furthermore, accuracy of the present scales with the suspension arrangement placing the tensile load cells in pure tension rather than using compressive load cells, is extremely accurate. Load on the platform can be measured with accuracy to within one pound in fifty thousand pounds.

The above description and attached drawings are given by way of example to set forth a preferred form of the present invention. The following claims more particularly set out the scope of the invention.

What I claim is:

1. An animal weighing scale, comprising:
   a support frame;
   an elongated weighing platform having a planar surface adapted to receive the animal and adapted to permit the animal to move over the platform from one end to another;
   first horizontal rigid elongated tie bars having opposed ends connecting the support frame and platform about pivot axes parallel to the planar platform surface and transverse to the length thereof to allow slight vertical deflection of the platform and to resist horizontal motion thereof in a longitudinal direction;
   second horizontal rigid elongated tie bars having opposed ends connecting the frame and platform about pivot axes parallel to the planar platform surface and oriented longitudinally with respect to the elongated platform to allow slight vertical deflection of the platform and to resist horizontal motion thereof in a transverse direction;
   tensile load cell means for generating an analog signal proportional to the magnitude of tensile force applied thereto;
   platform suspension means suspending the platform from the frame and mounting the tensile load cell means intermediate the platform and frame, for directly placing the load cell in tension in response to vertical downward deflection of the platform with respect to the frame when the animal is on the platform and for allowing free upward deflection of the platform without loading the cell means in compression; and
   isolator means between the weighing platform and frame and selectively operable to transfer complete support of the platform directly to the support frame thereby relieving any load on the load cell means and suspension means.

2. The scale as defined by claim 1 wherein the platform is rectangular and suspended at its four corners by the suspension means and wherein the isolator means is comprised of a selectively operable cam mechanism situated between the platform and frame at each of the four corners.

3. The scale as defined by claim 1 wherein the isolator means is comprised of:
   a pin on the platform;
   an eccentric cam mounted to the pin for rotation thereon about the axis of the pin between an inoperative position clear of the frame and an operative position engaging and directly supporting the platform on the frame; and
   crank means for rotating the cam between the inoperative and operative positions.

4. The scale as defined by claim 1 wherein the load cell means is situated elevationally above the platform and to one side thereof.

5. The scale as amended by claim 1 wherein the suspension means is comprised of clevis connector assemblies on the tensile load cell means including a top clevis assembly interconnecting the frame and load cell means, and a bottom clevis assembly interconnecting the load cell means and platform.

6. The scale as defined by claim 5 wherein the suspension means is connected to the platform through an upright slot formed therein, said slot enabling upward movement of the platform without causing corresponding upward movement of the suspension means.

* * * * *